UNITED STATES PATENT OFFICE.

JAMES BURNS, OF VERONA, PENNSYLVANIA, ASSIGNOR OF ONE-HALF HIS RIGHT TO PETER L. BANNEN, OF SAME PLACE.

IMPROVEMENT IN PROCESSES OF WELDING COPPER.

Specification forming part of Letters Patent No. 210,990, dated December 17, 1878; application filed October 14, 1878.

*To all whom it may concern:*

Be it known that I, JAMES BURNS, of Verona, in the county of Allegheny and State of Pennsylvania, have invented a certain new and useful Method of Welding Copper, and compounds therefor; and I do hereby declare the following to be a full, clear, and exact description of the invention, such as will enable others skilled in the art to which it pertains to make and use it.

This invention relates to a novel process for welding copper or mending broken articles of that metal; and consists in the use of certain materials and the mode of preparing and applying the same, substantially as hereinafter described and claimed.

I take concentrated lye and ordinary paper of any quality, and combine them as follows: One pound of lye is set in a suitable vessel over a hot fire and brought to a red boiling-heat. Then about half a pound of paper is crushed into small compass, and, after being dipped in water, is worked around in the lye until it melts into or amalgamates with the latter. When this is done the whole is poured out upon a slab or into a mold, and when cold is reduced to a powder or granular state, to facilitate its application to the work. In this condition it may be preserved in a suitable vessel for an indefinite time, and is always ready for use.

The pieces of copper to be welded are first heated sufficiently to cause the above compound to melt and adhere to them. Then it is applied by dusting it over them or rolling them in a box containing the compound, in about the same manner as borax is used in welding steel and iron. The compound then melts and runs over the surfaces. I then take a pinch of powdered sulphur and sprinkle it over the surfaces to be united, and then heat to welding-point, after which a blow or two of a hammer, or pressure from any source, completes the work and unites the parts perfectly, leaving no mark at the weld, and the metal so welded can be drawn or forged into any shape, the same as homogeneous copper.

If a crack or flaw occurs in forging a copper article, or the smith forces his fire so as to burn the metal and render it useless, a little of my compound permits the defect to be fully restored.

The trouble in welding copper seems to be the practical impossibility of getting it to a welding-heat, since usually the metal cracks and splinters before passing a cherry-red. The use of my invention, however, enables me to pass such heat and raise it to a welding-heat without the slightest danger of cracking or splintering.

The above proportions do not seem to be essential to success, as I have succeeded when double or three times the above proportion of paper has been compounded with the lye. I therefore do not confine myself to any specific proportions.

Both the paper and the lye may be found to have substitutes. Chemically, paper is simply one form of vegetable fiber; and as all forms of this are acted upon similarly by concentrated lye, any form of vegetable fiber may be found to do the work. Again, lye may be in the form of caustic potash or caustic soda, and there are other caustic alkalies, all of which probably might serve the same useful purpose, since their action on vegetable fiber is substantially common to all. Hence I do not limit my invention to the exact materials first above described, but include whatever materials may be found to do the same work in the same manner substantially.

It is not necessary to pulverize the compound; but for convenience of application and reliability of action, I prefer to do so.

The invention is equally applicable to all purposes which require copper welding.

I claim as my invention—

The process of welding copper, consisting in applying to it, first, a compound of caustic alkali and vegetable fiber, then powdered sulphur, then bringing it to welding-heat and applying pressure, substantially as described.

In testimony that I claim the foregoing I have hereunto set my hand this 11th day of October, 1878.

JAMES BURNS.

Witnesses:
T. J. MCTIGHE,
THOMAS CONNOLLY.